June 22, 1937.  W. DIETERLE  2,084,436
PHOTOGRAPHIC MATERIAL
Filed Dec. 13, 1933
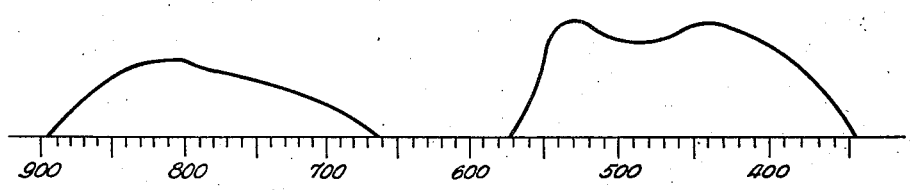
[3-ethyl-5-methyl-benzthiazole-(2)]-[1-ethyl-quinoline-(2)]-methinecyanine iodide and bis-[3-ethyl-benzthiazole-(2)]-heptamethinecyanine iodide
Inventor:
Walter Dieterle
By Philip S. Hopkins
his Attorney.

Patented June 22, 1937

2,084,436

UNITED STATES PATENT OFFICE 2,084,436

PHOTOGRAPHIC MATERIAL

Walter Dieterle, Dessau-Ziebigk in Anhalt, Germany, assignor to Agfa Ansco Corporation, Binghamton, N. Y., a corporation of New York Application December 13, 1933, Serial No. 702,237
In Germany December 14, 1932

2 Claims. (Cl. 95—7)

My present invention relates to photographic material.

One of its objects is to provide an improved photographic material.

Further objects will be seen from the detailed specification following hereafter.

Hitherto the amateur who has practiced the infra-red photography had to use two separate films for his purposes. These two different materials were necessary for the following two purposes:

1. For taking distant views and for obtaining so-called "night-effects" an emulsion sensitive for infra-red is necessary.

2. For taking landscapes and for portrait photography a highly orthochromatic emulsion is necessary.

For the portrait and the landscape photography the emulsion sensitive for infra-red it not suited, because with the orthochromatic emulsion the yellow filter factor is smaller, that is to say, more favorable than with the emulsion sensitive for infra-red (the yellow filter factor is the number which indicates how much longer the time of exposure must be when using a yellow filter than when using no filter).

I have found that it is possible to overcome the above drawback of having to use two different films by sensitizing the emulsion for yellow-green as well as for deep red and infra-red. The emulsion it not sensitized for the spectral yellow so that the emulsion has a gap of sensitiveness in this region. This gap may vary between about $540\mu\mu$ and $700\mu\mu$ according to the sensitizers used and the material required. It is preferably very short and may, for instance, extend from $580\mu\mu$ to $620\mu\mu$. For the purpose of the invention all pairs of orthochromatic and infra-red sensitizers are suitable which do not mutually influence each other in their sensitizing action. Inasmuch as numerous sensitizers of each group are known a few comparative experiments will suffice for selection of those which are suitable. It is, therefore, possible to prepare an emulsion which beside the initial sensitivity, is only sensitive for yellow-green on the one hand, and for deep red and infra-red on the other hand. This is a rather surprising result when considering that a panchromatic sensitizer and a sensitizer for infra-red generally influence each other so that their sensitizing action is lessened.

By sensitizing according to the present invention an emulsion for yellow-green, and for deep red and infra-red, an emulsion is obtained which can be designated as "universal emulsion". This emulsion can be used without a filter, for instance, for photographing architecture. For taking landscapes of portraits the emulsion may be used with a light, medium or strong yellow filter according to requirements, in the same way as such a filter is applied when photographing with a highly sensitized orthochromatic emulsion. When photographing distant views or so-called "night-effects", there is used a light or a strong red filter, if required there may even be used a black filter. A further advantage of the invention consists in the possibility of developing the exposed emulsion layer in yellow light which must, however, be free from green and red rays. It is very convenient to develop the film in this light inasmuch as it has a great physiological effect, that is to say, the eye is very sensitive to this light. The gap in sensitization in the spectral yellow does not prevent the reproduction of the yellow body color in a sufficient degree, because the yellow body colors reflect essentially green and red. Furthermore the photographic material has the advantage that it is well suited for photographing in misty weather in which case the sensitiveness to waves on the longer wave length side of the yellow sensitivity gap, for instance, above $600\mu\mu$, for instance from $610\mu\mu$ to $760\mu\mu$ is used by inserting a red filter before the objective. Therefore, the material offers the possibility to photograph under favorable and unfavorable meteorological conditions with the same success. By the use of a yellow filter or a red filter there may be obtained differing pictures when the photographs are taken under the same conditions of exposure. Thus a landscape taken behind a yellow filter in sunshine yields a normal picture while, when taken behind a red filter a picture is obtained which gives the impression of a landscape under moonshine.

The emulsions according to this invention may contain the usual additions, such as stabilizers, filter dyes and the like. The light sensitive material is preferably provided with an anti-halation layer which may be applied to the rear side of the material, or between the emulsion layer and the support.

The invention is illustrated in the accompanying drawing which shows the sensitivity curve of a silver halide emulsion sensitized with [3-ethyl-5-methyl-benzthiazole-(2)] - [1-ethyl-quinoline-(2)]-methinecyanine iodide and bis-[3-ethyl-benzthiazole-(2)]-heptamethinecyanine iodide.

The following examples serve to illustrate the invention.

*Example 1.*—1 kilo of a highly sensitive silver bromide gelatin emulsion containing about 2 per cent of silver iodide and ready for being cast is sensitized with 15 mgrs. of erythrosine dissolved in 10 cc. of water and then with 0.5 mgr. of Rubrocyanine (lepidine-trimethinecyanine) freshly dissolved in methanol. The emulsion is cast on glass or film as usual. The emulsion has a maximum of sensitivity at a wave length of about 555$\mu\mu$ and another one at a wave length of about 735$\mu\mu$ and a gap in sensitization extending over about 570 to 620$\mu\mu$.

Example 2.—1 kilo of a silver bromide gelatin emulsion containing about 4 per cent of silver iodide and ready for being cast is mixed with 12 mgrs. of the dye [3-ethyl-benzthiazole-(2)]-[1-ethyl-quinoline-(2)]-methinecyanine iodide dissolved in 24 cc. of alcohol and 1 mgr. of the dye 1.1'-diethylbenzthiopentacarbocyanine iodide dissolved in 10 cc. of methanol. The emulsion has a maximum of sensitivity at a wave length of about 520$\mu\mu$ and another at a wave length of about 700$\mu\mu$ and a gap in sensitization extending over about 540 to 630$\mu\mu$.

Example 3.—1 kilo of a silver bromide gelatin emulsion containing about 3.5 per cent of silver iodide and ready for being cast is sensitized with 15 mgrs. of the dye 1.1'-diethyl-2.2'-quino-6'-methyl-benzselenopseudocyanine iodide dissolved in 25 cc. of alcohol and 1 mgr. of the dye 1'-diethylbis-[3-ethyl-benzthiazole - (2)] - heptamethinecyanine iodide freshly dissolved in 10 cc. of methanol. The emulsion has a maximum of sensitivity at a wave length of about 540$\mu\mu$ and another one at a wave length of about 810$\mu\mu$ and a gap in sensitization extending over about 550 to 700$\mu\mu$.

These examples are in no way intended to limit the invention. It is well known that there exist a great many sensitizers for the yellow-green region of the spectrum and also numerous sensitizers for sensitizing an emulsion for deep red and infra-red are known. The dyes are selected in such a manner that the gap in sensitization in the yellow and the orange region of the spectrum is very marked. For this purpose it is necessary that the curve of sensitivity in the yellow green region has a steep drop towards the region of longer wave length.

The following examples illustrate the application of my improved photographic material.

Example I.—For photographing architecture under any conditions of light, there is used a very light yellow filter, for instance, Agfa yellow filter No. 1 (registered trade-mark) having a permeability for the light rays above 410$\mu\mu$. The effect obtained is about the same as obtained when using a usual orthochromatic emulsion.

Example II.—For photographing a landscape having in the foreground green meadows and with trees in leaf, there is used a middle yellow filter, for instance Agfa yellow filter No. 3 (registered trade-mark) which is permeable to waves above 460$\mu\mu$. The effect obtained is the same as when using a usual orthochromatic emulsion.

Example III.—For photographing a still-life or an arrangement of differently colored flowers with Nitra-light no filter is used. The layer gives about the same picture as if it were taken on a panchromatic layer, because on account of the high content of red and infra-red rays in the Nitra-light, and the sensitizing of the emulsion to deep red and infra-red rays, the red objects, for instance, red flowers are much better represented than with an orthochromatic emulsion layer. Yellow objects are likewise well copied, because they reflect deep red as well as yellow-green rays.

Example IV.—For photographing a picture with "night-effect" under bright sunshine and blue sky of a glacier-landscape in the alps, there is used a red filter, for instance, Agfa red filter No. 42 (registered trade-mark) which is permeable to waves above 600$\mu\mu$. The time of exposure is about 10 times greater than when making the picture without a red filter. The emulsion layer has under these conditions the same effect as an emulsion layer sensitized for deep red and infra-red.

Example V.—For photographing a distant view in misty weather a strong red filter or a black filter is used, for instance, Agfa red filter No. 83 (registered trade-mark) which is permeable to waves above 720$\mu\mu$. The time of exposure is determined by the sensitizer applied for sensitizing the emulsion for deep red and infra-red and by the light available; it can easily be ascertained by experiment.

My new photographic material may be developed in yellow light in the dark room, for instance, light which is composed of waves between 570$\mu\mu$ and 600$\mu\mu$.

What I claim is:

1. A photographic material comprising a support and a silver halide emulsion layer sensitized with [3-ethyl - 5-methyl-benzthiazole-(2)]-[1-ethyl-quinoline-(2)]-methinecyanine iodide and bis-[3-ethyl-benzthiazole -(2)]-heptamethinecyanine iodide to have sensitization maxima at about 540$\mu\mu$ and 810$\mu\mu$, and having a gap in sensitization extending over about 550 to 700$\mu\mu$.

2. A photographic material comprising a support and a silver halide emulsion layer sensitized with a [3-alkyl-benzthiazole-(2)-]-[1-alkyl-quinoline-(2)]-methinecyanine salt and a bis-[3-alkyl - benzthiazole - (2)] - heptamethinecyanine salt and having a gap in sensitization extending from about 540$\mu\mu$ to about 700$\mu\mu$.

WALTER DIETERLE.